United States Patent [19]

Kuhls et al.

[11] 4,078,134

[45] Mar. 7, 1978

[54] PROCESS FOR THE MANUFACTURE OF SUSPENSION POLYMERS OF TETRAFLUOROETHYLENE

[75] Inventors: Jürgen Kuhls, Burghausen (Salzach); Alfred Steininger; Herbert Fitz, both of Burgkirchen (Alz), all of Germany

[73] Assignee: Hoechst Aktiengesellschaft, Frankfurt am Main, Germany

[21] Appl. No.: 688,234

[22] Filed: May 20, 1976

[30] Foreign Application Priority Data

May 28, 1975 Germany ............................ 2523569

[51] Int. Cl.² .......................................... C08F 114/26

[52] U.S. Cl. ................................... 526/204; 526/209; 526/247; 526/255

[58] Field of Search ............... 526/204, 209, 247, 255

[56] References Cited

U.S. PATENT DOCUMENTS 3,132,123  5/1964  Harris et al. ........................ 526/236

Primary Examiner—Harry Wong, Jr.
Attorney, Agent, or Firm—Connolly and Hutz

[57] ABSTRACT

Polymers of tetrafluoroethylene are produced by suspension polymerization in the presence of small amounts of definite perfluorinated ethers. The products obtained have improved processing properties.

5 Claims, No Drawings

PROCESS FOR THE MANUFACTURE OF SUSPENSION POLYMERS OF TETRAFLUOROETHYLENE

This invention relates to a process for the manufacture of polymers of tetrafluoroethylene having improved processing properties by suspension polymerization.

U.S. Pat. No. 3,142,665 provides a process for making dispersion polymers of tetrafluoroethylene having an average particle size of approximately 0.05 to 0.5 $\mu$m by polymerizing tetrafluoroethylene in emulsion in the presence of small amounts of perfluoroalkenes or perfluoro-alkoxytrifluoroethylenes. The modified dispersion polymers obtained are subsequently coagulated and dried. The resulting powders are admixed with the usual lubricants and can then be processed by the so-called paste extrusion technique. Owing to their reduced molecular weight (SSG values in the range of from 2.23 to 2.170 g/cm$^3$; SSG = specific standard gravity according to ASTM D 1457-62 T) and the resulting strong tendency to crack formation, the polymers are, however, unsuitable to manufacture thick-walled molded and sintered objects.

It has also been proposed (U.S. Pat. No. 3,655,611) to produce polytetrafluoroethylene powders by suspension polymerization, which are modified by adding small amounts of 0.05 to 0.5 mol % of hexafluoropropylene to reduce the so-called cold flow. British Pat. No. 1,116,210 proposes to polymerize tetrafluoroethylene by the suspension process together with 0.003 to 1.5 mol % of a perfluorinated ether or perfluoro-alkoxyethylene in the presence of precipitating agents.

Suspension polymers of tetrafluoroethylene are processed, inter alia, into molded and sintered blocks from which sliced sheets are made. Due to the progressing rationalization in the manufacture of sliced sheets, sintered blocks of large diameter are asked for to an increasing extent. Even under very mild cooling conditions cracks are formed in the interior of such blocks due to the increased contraction strain as a result of the greater thickness. By this phenomenon the entire block or at least the interior thereof become unsuitable for processing into sliced sheets so that the manufacturer can only produce blocks below certain dimensions from the usual polymers.

To obtain sliced sheets having the desired high dielectric strength a high densification of the blank produced from the polytetrafluoroethylene powder by molding prior to sintering is indispensible. To ensure the necessary densification the crude polymer from suspension polymerization must be subjected first to a wet grinding process and, after drying, to a fine grindung process in hammer or jet mills until an average particle size of about 30 $\mu$m is obtained. Hence, the grinding properties of such products are of decisive importance. In British Pat. No. 1,116,210 a direct molding of the obtained and dried crude polymers without previous grinding is said to be possible. But the sliced sheets produced from the sintered blocks are very porous and, as a result, they have poor electric properties. When, however, the crude polymer obtained by the process of the said British Pat. No. 1,116,210 is subjected first to a wet grinding and then to a dry grinding procedure, the grinding properties are noticeably deteriorated, as compared to non-modified tetrafluoroethylene suspension polymers. The ground material acquires a fibrous structure and contains an undesired proportion of coarse particles above 100 $\mu$m leading to the formation of so-called fish eyes in the sliced sheets made therefrom.

All products produced according to the state of the art have a high tendency to crack formation which cannot be overcome even by fine grinding. It is, therefore, desirable to provide an improved tetrafluoroethylene polymer which, when processed into sintered blocks and other thick-walled objects, is completely or substantially free from the tendency to crack formation without the other properties, especially those which are important to the manufacture of sliced sheets, being affected.

It is the object of the present invention to provide a process for polymerizing tetrafluoroethylene by the suspension method in the presence of the usual catalysts and optionally buffer substances, precipitating agents, small amounts of emulsifiers and heavy metal salts, which comprises polymerizing the tetrafluoroethylene in the presence of from 0.0004 to 0.0029 mol %, calculated on the monomer used, of a perfluorinated ether of the formula

in which $R_f$ represents a perfluoralkyl radical having from 1 to 10 carbon atoms, or of the formula

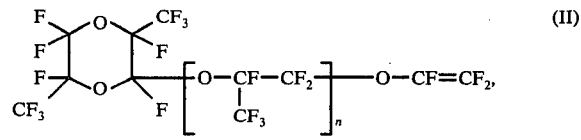

in which $n$ is zero to 4, or of a mixture of the said perfluorinated ethers as modification agent.

The perfluoro(alkylvinyl) ethers of the formula (I) are those in which $R_f$ represents a perfluorinated alkyl radical, preferably a linear perfluorinated alkyl radical having from 1 to 10 and preferably from 1 to 4 carbon atoms. Preferred are the perfluoro-(methylvinyl), -(ethylvinyl), -(butylvinyl) and especially the perfluoro-(propylperfluorovinyl) ethers.

In the ethers of formula (II) to be used according to the invention $n$ is preferably zero or equal to 1, more preferably it is zero.

The ethers of formulae (I) and (II) can be used in pure form or in the form of mixtures of ethers carrying different radicals $R_f$ or having different values for $n$. Alternatively, mixtures of the ethers of formulae I and II can be used.

The amount of modification agent should be in the range of from 0.0004 to 0.0029%, preferably 0.001 to 0.0025 mol %, and more preferably 0.001 to 0.0020 mol %, calculated on the tetrafluoroethylene used.

It proved advantageous to add the total amount of the modification agent in dosed quantities as soon as the required polymerization pressure is reached. It is likewise possible to introduce a partial amount into the vessel prior to the beginning of polymerization and to meter in the balance, or the total amount is metered in when up to 70%, preferably up to 30% of the tetrafluoroethylene are polymerized. Either continuous or batchwise addition being possible.

Ethers of formula (I) can be prepared, for example, by thermolysis as described in U.S. Pat. Nos. 3,180,895 and 3,250,808 and ethers of formula (II) are obtainable by the processes described in German Offenlegungsschriften Nos. 2,434,992 and 2,517,357.

The suspension polymerization in accordance with the present invention is carried out under conventional conditions. Catalysts to be used are persulfates, percarbonates, perborates, peroxides, per-acids, azo-compounds, or also permanganates (cf. U.S. Pat. Nos. 2,393,967; 2,394,243; 2,471,959; 2,510,783; 2,515,628; 2,520,338; 2,534,058; 2,565,573; 2,599,299; 3,632,847). There may also be used redox catalysts systems comprising one of the aforesaid peroxidic compounds (cf U.S. Pat. No. 2,393,967, left hand column on page 3, lines 22 et seq.), especially persulfate with a reducing component such as bisulfite, hydrazin, dithionite, or a water-soluble nitrogen compound liberating a diimine, for example, azodicarboxylic acid and the salts thereof, or azodicarbonamide.

The polymerization is suitably carried out at a pressure in the range of from about 0.5 to 20, preferably 3 to 10 atmospheres gage and at temperatures in the range of from about 5° to 80° C, preferably 10° to 35° C. The pH of the polymerization medium is not critical, it can be acid, neutral or alkaline. When permanganates or azo-compounds are used, an acid medium is preferably used, with all other catalysts an alkaline medium being preferred.

If desired, the polymerization can be carried out in the presence of small amounts of buffer substances, especially ammonium salts, for example, ammonium carbaminate, ammonium carbonate, ammonium chloride, or ammonium oxalate. Known precipitating agents may also be added, for example borax or inorganic water-soluble phosphates. To facilitate catalyst decomposition small amounts of heavy metal salts may be added in a concentration of from $1 \times 10^{-5}$ to $40 \times 10^{-5}$, preferably $3 \times 10^{-5}$ to $20 \times 10^{-5}$% by weight, calculated on the total aqueous mixture, for example, the salts of bivalent copper, bi- or trivalent iron, trivalent chromium, or monovalent mercury.

In certain cases it proved advantageous to add to the polymerization mixture small amounts of telogenically inactive emulsifiers, for example, salts of perfluorinated carboxylic acids. The concentration of such emulsifiers should, however, be below the quantity necessary for the formation of an aqueous emulsion, suitably it should be below 30 ppm, preferably it is below 20 ppm.

It has surprisingly been found that with the use of extremely small quantities of the specified modification agents according to the invention the tendency to crack formation of molded and sintered blocks is so drastically reduced that sintered blocks of an absolutely unusual weight of up to 80 kg (corresponding to a diameter of up to 40 cm) can be produced which are free from crack formation through to the core as proved by an optical examination of the sliced sheets made therefrom.

The following Tables 1 and 2 show that in this respect the products obtained by the process of the invention are far superior to the products according to the state of the art.

Table 1

Crack formation in sintered blocks of 14 kg made from modified polytetrafluoroethylene

| Patent | Example | modification agent | mol % added, calc.on TFE | mol % in polymer | crack formation from diameter +) |
|---|---|---|---|---|---|
| US 3,142,665 | Table II, No. 18 | $CF_3$-$CF=CF_2$ | 0.7 | | fully cracked |
| | own experiments | $CF_3$-$(CF_2)$-O-$CF=CF_2$ | 0.04 | | fully cracked |
| | no example given | other conditions | 0.02 | | fully cracked |
| | | cf. Table II,No. 18 | 0.002 | | fully cracked |
| | | | 0.0002 | | fully cracked |
| US 3,655,611 | Table IV, 5 A | $CF_3$-$CF=CF_2$ | | 0.04 | fully cracked |
| GB 1,116,210 | Table page 5,I | $CF_3(CF_2)_2$-O-$CF=CF_2$ | 0.037 | 0.0056 | 70 mm |

The cylindrical blocks (height 21 cm, diameter 20 cm) were heated at a rate of 22° C/hr, kept for 12 hours at 380° C (rest temperature) and then cooled at a rate of 22° C/hr.
+) when the block of 20 cm diameter is sliced crack formation can be observed from the indicated diameter on.

The products produced by the process of the invention have surprising advantages over pure non-modified polytetrafluoroethylene and surprisingly they also have advantages over products produced with higher amounts of the modification agents to be used according to the invention (over 0.0029 mol %).

As compared to unmodified polytetrafluoroethylene, the products of the invention exhibit the following advantages:

1. Large blocks which are free from cracks and suitable for making sliced sheets can be produced by molding and sintering. The sheets have a good quality throughout the whole diameter of large blocks.

2. Surprising improvement in the transparency of the sheets in spite of the extremely small amount of modification agent used.

3. Improved thermostability of the sheets as a result of the variation of density after thermal treatment.

As compared to products produced with larger amounts (over 0.0029 mol %) of the perfluorinated modification agents (for example according to British Pat. No. 1,116,210), the products of the invention exhibit the following advantages:

1. Larger blocks free from cracks can be produced by molding and sintering. It is surprising that with the use of higher amounts of modification agent an increased crack formation is observed, so that for crack formation the optimum concentration of modification agent is below 0.0029 mol %, preferably 0.0020 mol %, calculated on tetrafluoroethylene used. This fact is illustrated by Table 2.

2. The products obtained have improved mechanical properties. It has been observed that the tensile strength of the sintered material is distinctly diminished when the amount of modification agents exceeds the aforesaid value.

3. Better electrical properties of the sheets sliced from the outer zones of the sintered blocks. In this case, too, a higher amount of modification agent detrimentally affects the dielectric strength in the border zones of the blocks.

4. Better grinding properties. It has been observed that products modified with a higher amount of perfluorinated ether have poorer grinding properties on the usual air jet and hammer mills. As a result thereof, the powders obtained have a lower apparent density than unmodified polytetrafluoroethylene powders. The sliced sheets made therefrom have areas of different transparency (specks and white spots). These disadvantages are not observed when the small amounts of modification agent according to the invention are used.

Table 2

| Example | sintered blocks of 14 kg cracks from mm φ | sintered blocks of 14 kg processing range °C | sintered blocks of 14 kg molecular weight | crystallization rate h Δ V spec.x 10³ | sliced sheets dielectric strength kV/mm point 1 | sliced sheets dielectric strength kV/mm point 2 | sliced sheets dielectric strength kV/mm point 3 | disks spec. gravity g/cm³ | sliced sheets tensile strength N/mm² | sliced sheets elongation at break % |
|---|---|---|---|---|---|---|---|---|---|---|
| comp. Ex. | | | | | | | | | | |
| I.Table p.5 GB 1,116,210 | 70 | 360 – 390 | $7.10^6$ | 114 | 80 | 77 | 0 | | | |
| II.Table p.5 GB 1,116,210 | 100 | 350 – 380 | $4.10^6$ | 124 | 74 | 81 | 0 | | | |
| A (analog. to Ex.15 without mod. agent) | 40 | | | | 75 | 75 | 0 | 2.163 | 34 | 450 |
| according to invention | | | | | | | | | | |
| 5 | none | 360 – 410 | $9.10^6$ | 104 | 82 | 94 | 96 | 2.145 | 33.5 | 430 |
| 13 | none | 360 – 410 | $9.10^6$ | | 83 | 90 | 85 | 2.148 | 33 | 430 |
| 14 | none | 360 – 410 | $9.10^6$ | | 80 | 88 | 79 | 2.150 | 32.5 | 400 |

REFERRING TO TABLE 2

1. Processing range: the heating and cooling periods were the same as specified at the bottom of Table 1. The indicated temperature range includes the possible rest temperatures within which the sliced sheet did not exhibit oversintering (mottles) and had a tensile strength above 30 kg/cm².

2. Molecular weight: the molecular weight was measured by the traction-creeping method according to C. Airoldi (cf. C. Airoldi, C. Carbuglio and M. Ragazzini, J. appl. Polym. Sc. volume 14, pages 79 zo 88 (1970)).

3. Crystallization speed: in a precision dilatometer (H. Wilski, Makromol. Chemie 150 (1971) page 209) test specimens having a weight of 1.5 g and taken from sintered plates were heated at a constant rate of 30° C/hr from 25° to 350° C and then cooled at the same rate. The indicated values relate to the reduction of the specific volume (Δ V. spec) on cooling from 320° to 250° C.

4. Dielectric strength: the block having a weight of 14 kg (dimensions: about 20 cm heigh and about 20 cm in diameter) was sliced from the outside towards the center into a sheet having a thickness of 200 μ. The dielectric strength was tested with a dielectric strength tester. Point 1 corresponds to the slicing range of from 190 to 173 mm, point 2 to the slicing range of from 149 to 130 mm and point 3 to 77 to 56 mm of the block diameter.

The dielectric strength tester used was a device of Messrs. Messwandler Bau GmbH, Bamberg, Type JPG 30/0.5 (electrodes: on top ball electrode diameter 20 mm, at bottom plate electrodes diameter 50 mm; according to VDE 0303/T2 or DIN 53 481. The average value was calculated from at least 10 individual values. Values below 75% of the second highest value were discarded. The number of individual values used to calculate the average value must amount to at least 70% of all individual values.

5. Specific gravity: it was measured with disks having a diameter of 25 mm which had been compressed at 352 bars and sintered for 1 hour at 380° C by the buoyancy method at 23° C.

6. Tensile strength and elongation at break: were measured according to ASTM D 1457 - 62 T with test bars according to ASTM D 1708. The indicated values are average values of 10 measurements on sliced sheets of different zones of the 14 kg block.

The following examples illustrate the invention.

EXAMPLES 1 to 14(cf. Table 3)

a. Suspension polymerization

The polymerization autoclave used had a capacity of 180 l and an enamel inside lining and was provided with a baffle. It was charged with 120 l of desalted water and the additives specified in Table 3. The stirrer was switched on at a speed of 100 revolutions per minute, the autoclave was flushed 15 times with nitrogen and two times with tetrafluoroethylene (2 atmospheres gage) and tetrafluoroethylene was forced in up to the desired pressure (as indicated in Table 3). After increase of the stirrer speed to 180 revolutions per minute, the additives indicated in column 3 were metered in and it was rinsed with 900 cc of water. Polymerization was continued under the specified pressures and temperatures until the solids content given in % by weight, calculated on the mixture, was reached.

b. Processing

The pressure of the polymerization vessel was released and the vessel was flushed three times with nitrogen (4 to 5 atmospheres gage). The aqueous medium was discharged and in the polymerization autoclave the polymer was washed three times, each time with 100 liters of water at a stirring speed of 110 revolutions per minute. Next, about one-third of the polymer was ground two times in a 100 liter glass vessel, each time with 50 liters of water for 10 minutes with water replacement, to an average particle size of 200 to 400 μm. The water in excess was removed in a straining bowl and the product obtained was dried in a layer of from 5 to 7 cm for 6 hours at 240° C in a drying cabinet with circulating air. The product was ground in a helical jet mill or hammer mill to an average particle size of 20 to 70 μm.

Table 3

Suspension polymerization of tetrafluoroethylene in the presence of small amounts of perfluorovinyl ethers

| Ex. No. | introduced together with aqueous medium | metered in after having reached polymerization pressure | polymerization temp. °C | polymerization pressure atm.gage | solids content wt. % |
|---|---|---|---|---|---|
| 1 | $N_2H_4 \cdot H_2O$ (108 mg) $NH_3$ (18 %) (90 cm³) | $(NH_4)_2S_2O_8$(580 mg) after 10% conversion 0.4 g I; | 32 | 8 | 22 |

Table 3-continued

Suspension polymerization of tetrafluoroethylene in the presence of small amounts of perfluorovinyl ethers

| Ex. No. | introduced together with aqueous medium | metered in after having reached polymerization pressure | polymerization temp. °C | polymerization pressure atm.gage | solids content wt. % |
|---|---|---|---|---|---|
|  | CF$_3$-(CF$_2$)$_6$COONH$_4$ (90 mg) CuSO$_4$ (2 %) (2 cm$^3$) | Rf = n-C$_3$F$_7$ after-dosed |  |  |  |
| 2 | same | same 0.8 g after-dosed | 32 | 8 | 19 |
| 3 | NH$_3$ (18 %) (30 cm$^3$) CuSO$_4$ (2 %) (2 cm$^3$) CH$_6$N$_2$O$_2$ (7.8 g) | (NH$_4$)$_2$S$_2$O$_8$ (580 mg) NH$_3$ (9 %) (60 cm$^3$) N$_2$(CONH$_2$)$_2$[1)] (250 mg) in 10 % NaOH (6 cm$^3$) CuSO$_4$ (2 %) (2 cm$^3$) after 10% conversion 1.5 g I; Rf = n-C$_3$F$_7$ | 15 | 7 | 22 |
| 4 | CF$_3$-(CF$_2$)$_6$-COONH$_4$ (270 mg) NH$_3$ (18 %) (30 cm$^3$) CuSO$_4$ (2 %) (2 cm$^3$) CH$_6$N$_2$O$_2$[1)] (7.8 g) | (NH$_4$)$_2$S$_2$O$_8$ (1160 mg) NH$_3$ (12 %) (65 cm$^3$) N$_2$(COONa)$_2$[1)] (835 mg) CuSO$_4$ (2 %) (2 cm$^3$) 1.2 g I; Rf = n-C$_3$F$_7$ | 25 | 6 | 22 |
| 5 | CF$_3$(CF$_2$)$_6$-COONH$_4$ (270 mg) NH$_3$ (18 %) (30 cm$^3$) CuSO$_4$ (2 %) (2 cm$^3$) CH$_6$N$_2$O$_2$[1)] (7.8 g) | (NH$_4$)$_2$S$_2$O$_8$ (290 mg) NH$_3$ (9 %) (60 cm$^3$) N$_2$(CONH$_2$)$_2$[1)] (125 mg) in 10 % NaOH (6 cm$^3$) CuSO$_4$ (2 %) (2 cm$^3$) 0.9 g I; Rf = n-C$_3$F$_7$ | 24 | 8 | 20 |
| 6 | CF$_3$-(CF$_2$)$_6$-COONH$_4$ (420 mg) NH$_3$ (18 %) (30 cm$^3$) CuSO$_4$ (2 %) (2 cm$^3$) CH$_6$N$_2$O$_2$[1)] (7.8 g) | (NH$_4$)$_2$S$_2$O$_8$ (1160 mg) (NH$_3$ (9 %) (60 cm$^3$) N$_2$(CONH$_2$)$_2$ (500 mg) in 10 % NaOH (6 cm$^3$) CuSO$_4$ (2 %) (2 cm$^3$) 1.2 g I; Rf = n-C$_3$F$_7$ | 34 | 4 | 22 |
| 7 | (NH$_4$)$_2$C$_2$O$_4$[1)] (1.1 g) | I; Rf = n-C$_3$F$_7$ (1.6 g) (KMnO$_4$) (200 mg) | 15 | 6 | 20 |
| 8 | (NH$_4$)$_2$C$_2$O$_4$[1)] (1.1 g) | I; Rf = n-C$_3$F$_7$ (0.8 g) KMnO$_4$ (200 mg) | 15 | 6 | 20 |
| 9 | Na$_2$B$_4$O$_7$ · 10 H$_2$O (290 g) (CF$_3$-(CF$_2$)$_6$COONH$_4$ (2.2 g) NH$_3$ (18 %) (5.8 ml) CuSO$_4$ (2 %) (1.3 ml) | I; Rf = n-C$_3$F$_7$ (1.6 g) Na$_2$S$_2$O$_3$ (800 mg) (NH$_4$)$_2$S$_2$O$_8$ (800 mg) | 25 | 9 | 20 |
| 10 | CF$_3$-(CF$_2$)$_6$COONH$_4$ (270 mg) CH$_6$N$_2$O$_2$[1)] (7.8 g) CuSO$_4$ (2 %) <br><br> NH$_3$ (18 %) | II; n = 0 (1.85 g) (NH$_4$)$_2$S$_2$O$_8$ (1.16 g) (2 ml) <br><br> (30 ml) | 25 <br><br> N$_2$(CO-ONa)$_2$[1)] (835 g) NH$_3$ (9 %) (120 ml) | 6 | 20 |
| 11 | CF$_3$-(CF$_2$)$_6$COONH$_4$ (270 mg) CH$_6$N$_2$O$_2$[1)] (7.8 g) CuSO$_4$ (2 %) <br><br> NH$_3$ (18 %) (30 ml) | CuSO$_4$ (2 %) (2 ml) I;RF=n-C$_3$F$_7$ (1.6 g) (NH$_4$)$_2$S$_2$O$_8$ (580 mg) (8 ml) <br><br> N$_2$(CONH$_2$)$_2$[1)] (125 mg) in 10% NaOH (6 ml) | 15 <br><br> NH$_3$ (9 %) (120 ml) | 8 | 20 |
| 12 | CF$_3$-(CF$_2$)$_6$COONH$_4$ (540 mg) CH$_6$N$_2$O$_6$[1)] (7.8 g) CuSO$_4$ (2 %) (8 ml) NH$_3$ (18 %) (30 ml) | I;Rf=n-C$_3$F$_7$ (1.6 g) (NH$_4$)$_2$S$_2$O$_8$ (1.16 g) NH$_3$ (9 %) (120 ml) N$_2$(CONH$_2$)$_2$ (70 mg) after dosage N$_2$(CONH$_2$)$_2$[1)] (20 mg) | 15 | 8 | 20 |
| 13[2)] | C$_7$F$_{13}$O$_3$K[1)] (0.84 kg) CH$_6$N$_2$O$_2$ (210 g) CuSO$_4$ (2 %) (18.6 ml) | N$_2$(COONH$_2$)$_2$[1)] (1600 mg) NaOH (10 %) (18 ml) (NH$_4$)$_2$S$_2$O$_8$ II; n = 0 (5.2 g) | 15 | 4.5 | 25 |
| 14[2)] | as in Ex. 13 | II; n = 1 (7.3 g) as for the rest like Ex. 13 | 15 | 4.5 | 25 |

Explanation:
[1)]CH$_6$N$_2$O$_2$ = ammonium carbaminate
(NH$_4$)$_2$C$_2$O$_4$ = ammonium oxalate
N$_2$(CONH$_2$)$_2$ = azodicarbonamide
N$_2$(COONa)$_2$ = sodium salt of azodicarboxylic acid
C$_7$F$_{13}$O$_3$K = potassium perfluoro-($\beta$-propoxypropionate)
[2)] 250 liter vessel charged with 210 liters of desalted water
the percentages refer to aqueous solutions, the concentrations are % by weight

What we claim is:

1. In the process for polymerizing tetrafluoroethylene by the suspension process in the presence of a catalyst and optionally buffer substances, pecipitating agents, small amounts of emulsifiers and heavy metal salts, the improvement which comprises conducting the suspension polymerization in the presence of from 0.0004 to 0.0029 mol %, calculated on the tetrafluoroethylene used, of a perfluorinated ether having the formula:

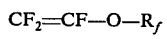

(I)

in which $R_f$ represents a perfluoroalkyl radical having from 1 to 10 carbon atoms or a perfluorinated ether having the formula:

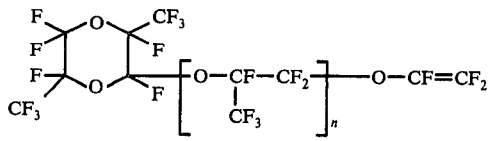 (II)

in which *n* is zero to 4, or a mixture of perfluorinated ethers according to formulas (I) and (II).

2. The process as claimed in claim 1, wherein the perfluorinated ether is present during the suspension polymerization in an amount of from 0.001 to 0.0020 mol %, calculated on the tetrafluoroethylene used.

3. The process as claimed in claim 1, wherein the perfluoroalkyl radical in formula (I) is a straight chain radical having from 1 to 4 carbon atoms.

4. The process as claimed in claim 1, wherein *n* in formula (II) stands for zero or 1.

5. In the method of producing shaped articles of modified polytetrafluoroethylene by molding, sintering and ram extruding modified polytetrafluoroethylene, the improvement which comprises obtaining shaped articles free from cracks by molding, sintering and ram extruding shaped articles from modified polytetrafluoroethylene obtained by the process of claim 1.

* * * * *